(12) United States Patent
Field

(10) Patent No.: US 7,462,654 B2
(45) Date of Patent: Dec. 9, 2008

(54) CORROSION-RESISTANT COATING COMPOSITION

(75) Inventor: Rex J. Field, Worms (DE)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 10/094,382

(22) Filed: Mar. 8, 2002

(65) Prior Publication Data

US 2002/0177646 A1 Nov. 28, 2002

Related U.S. Application Data

(60) Provisional application No. 60/276,051, filed on Mar. 15, 2001.

(51) Int. Cl.
*C08K 9/06* (2006.01)

(52) U.S. Cl. .............. 523/200; 523/212; 524/430; 524/492; 524/493; 252/387; 252/389.1; 252/389.3; 252/389.31

(58) Field of Classification Search .......... 524/492, 524/493, 430; 252/389.1, 387, 389.3, 389.31; 523/200, 212

See application file for complete search history.

(56) References Cited

U.S. PATENT DOCUMENTS

| | | | |
|---|---|---|---|
| 3,249,463 A | | 5/1966 | Carlée |
| 3,634,288 A | | 1/1972 | Youngs |
| 3,953,646 A | | 4/1976 | Fletcher et al. |
| 3,963,627 A | * | 6/1976 | Cottrell ............... 252/4 |
| 4,081,412 A | | 3/1978 | Doroszkowski et al. |
| 4,174,338 A | * | 11/1979 | Goller et al. ............ 524/863 |
| 4,263,051 A | | 4/1981 | Crawford et al. |
| 4,321,534 A | * | 3/1982 | Mlot-Fijalkowski et al. 324/216 |
| 4,374,687 A | | 2/1983 | Yamamoto |
| 4,407,899 A | | 10/1983 | Hara et al. |
| 4,518,734 A | * | 5/1985 | Brouillette et al. ........ 524/378 |
| 4,792,357 A | | 12/1988 | Bier |
| 5,009,874 A | | 4/1991 | Parmentier et al. |
| 5,098,938 A | | 3/1992 | Savin |
| 5,110,689 A | * | 5/1992 | Watanabe et al. ........... 428/623 |
| 5,143,948 A | * | 9/1992 | Okinoshima et al. ........ 523/212 |
| 5,221,337 A | | 6/1993 | Lüers et al. |
| 5,266,432 A | * | 11/1993 | Hayashi et al. ............ 430/109.4 |
| 5,272,185 A | * | 12/1993 | Matsumura et al. ......... 523/212 |
| 5,294,485 A | * | 3/1994 | Takao et al. ............... 428/626 |
| 5,519,080 A | | 5/1996 | Matsushita et al. |
| 5,609,968 A | * | 3/1997 | Yoshimi et al. ............ 428/623 |
| 5,637,636 A | | 6/1997 | Cartwright et al. |
| 5,648,327 A | * | 7/1997 | Smerznak et al. .......... 510/340 |
| 5,738,801 A | | 4/1998 | Ziegler et al. |
| 5,795,660 A | * | 8/1998 | Yoshimi et al. ............ 428/626 |
| 5,814,397 A | | 9/1998 | Cagliostro et al. |
| 5,900,315 A | * | 5/1999 | Little .................... 428/405 |
| 5,928,723 A | | 7/1999 | Koehlert et al. |
| 5,936,021 A | | 8/1999 | Bryant et al. |
| 6,143,400 A | | 11/2000 | Schwertfeger et al. |
| 6,323,170 B1 | * | 11/2001 | Wierenga et al. ........... 510/214 |
| 6,451,437 B1 | * | 9/2002 | Amidaiji et al. ............ 428/447 |
| 6,720,368 B2 | * | 4/2004 | Field .................... 523/200 |
| 7,182,537 B2 | * | 2/2007 | Policicchio et al. ........ 401/138 |
| 2001/0034375 A1 | | 10/2001 | Schwertfeger et al. |

FOREIGN PATENT DOCUMENTS

| | | |
|---|---|---|
| DE | 195 15 539 A1 | 10/1996 |
| EP | 348890 A1 * | 6/1989 |
| EP | 0 442 325 A1 | 8/1991 |
| EP | 0 611 810 A2 | 8/1994 |
| EP | 0 884 277 A1 | 12/1998 |
| EP | 884277 * | 12/1998 |
| GB | 721 605 | 1/1955 |
| GB | 1 062 599 | 3/1967 |
| GB | 1 363 039 | 8/1974 |
| JP | 60137939 A | 7/1985 |
| JP | 03215570 A | 9/1991 |
| JP | 05001191 A | 1/1993 |
| JP | 06136320 A | 5/1994 |
| JP | 9-217278 A2 | 8/1997 |
| RU | 2092511 C1 | 10/1997 |
| WO | WO 81/01857 A1 * | 7/1981 |
| WO | WO 96/02158 A1 | 2/1996 |
| WO | WO 98/23366 A1 | 6/1998 |
| WO | WO 9936480 A1 * | 7/1999 |

OTHER PUBLICATIONS

Lewis, Peter; Pigment Handbook 2nd Ed., vol. 1, John Wiley & Sons, New York 1988 (pp. 175-181).*

Aldcroft, D., *Polymers Paint Color Journal*, vol. 184, No. 4358, pp. 423-425 (Sep. 7, 1994).

Field, R.J. et al., "Matting of UV Coatings with Silica: Effects of Particle Size (Part 2)," *PPCJ*, pp. 35-38 (Nov. 1995).

(Continued)

Primary Examiner—Bernard Lipman

(57) ABSTRACT

The invention provides an anticorrosive surface coating composition comprising a resin system, and a hydrophobic metal oxide. The hydrophobic metal oxide is characterized by being produced via a wet process and having a surface area of at least about 350 m²/g. The invention also provides a method of producing such an anticorrosive coating composition. The invention further provides a substrate having a surface coated with the surface coating composition of the invention, as well as a method of imparting corrosion resistance to a surface of a substrate.

22 Claims, No Drawings

OTHER PUBLICATIONS

Maskery, S.E., "The Dispersion, Matting Efficiency and Formulation of Silica Matting Agents in Wood Finishes," *Lecture to be Given to the Association of Paint Technologists at the Paint and Polymers Exhibition in Milan* (Nov. 3, 1981).

Maskery, S.E., "Development and Applications for Matting Agents," *Pigment and Resin Technology*, pp. 11-19 (Apr. 1973).

"Monsanto's Silica Aerogel for Efficient Thermal Insulation," *Monsanto Technical Bulletin*, I-180, pp. 1-10 (Oct. 1959).

Monsanto Applications Guide to the Effective Use of Santocel® Silica Aerogels.

Monsanto's Santocel brochure, pp. 1-10.

"Today's Flatting Agents for Tomorrow's Formulation," *Degussa Technical Library*, GP-91, pp. 1-6.

"HK188 vs. Syloid 244," *Degussa Technical Library*, GP-98, pp. 1-8.

Aerosil® for Lacquers and Paints, *Technical Bulletin Pigments*, Degussa No. 68, pp. 1-28.

JP 08-209029 to Mizusawa Industrial Chem., Publication Date Aug. 13, 1996 (Abstract only).

* cited by examiner

CORROSION-RESISTANT COATING COMPOSITION

CROSS-REFERENCE TO RELATED PATENT APPLICATIONS

This patent application claims priority to provisional U.S. Patent Application No. 60/276,051 filed Mar. 15, 2001.

FIELD OF THE INVENTION

This invention pertains to an anticorrosive coating composition and a method of producing such a coating composition.

BACKGROUND OF THE INVENTION

Metal oxides, particularly silica, have been incorporated into certain surface coating materials in order to achieve the impression of "mattness." A wet film applied to a substrate is initially held flat by the forces of surface tension, thereby resulting in a glossy surface. As the film dries and cures, the increasing viscoelasticity associated with the sol-gel transition hinders the movement of particles into the film, and the surface deforms to accommodate the matting agent particles. This roughness is maintained in the solidified film, which then is characterized by a matt finish. While the matting effect attributable to certain metal oxides produces a desirable surface appearance for some applications, a surface coating composition desirably possesses additional properties, such as corrosion resistance, in order to enhance its utility for a variety of applications.

Corrosion resistance is a characteristic of a composition that resists damage (e.g., bubbling, cracking, and staining) after wetting by or absorption of water and/or other materials (e.g., liquids) or after exposure to adverse conditions that would tend to cause the coated substrate to lose its original function. Prior attempts at rendering a surface coating composition more corrosion resistant have used the incorporation of certain metal oxides, particularly treated fumed silica, into the composition.

Silica, an inorganic material having silicon dioxide ($SiO_2$) as a basic structural unit, is useful in a wide variety of commercial applications. Silica exists in a variety of molecular forms, which include, for example, monomers, dimers, oligomers, cyclic forms, and polymers. In addition, silica can be amorphous, crystalline, hydrated, solvated, or dry, and can exist in a variety of particulate and aggregated states.

Amorphous silica can be formed by molecular precipitation, for example, by cooling a supersaturated solution, concentrating an undersaturated solution, or by careful hydrolysis of a solution of a labile silica precursor, such as a $SiCl_4$, esters of silica, $Si(OR)_4$, and the like, to provide a supersaturated solution of $Si(OH)_4$, from which precipitates amorphous silica.

Pyrogenic, or "fumed silica," which typically has a particle size from about 2-20 nm, is formed from the vapor phase. For example, silica (usually sand) can be vaporized at about 2000° C. and cooled to form anhydrous amorphous silica particles. Alternatively, silica can be sublimed at about 1500° C. in the presence of a reducing agent (e.g., coke) to form SiO, which can be oxidized to form particulate silica. Other methods of producing fumed silica include, for example, oxidation of $SiCl_4$ at high temperatures or burning $SiCl_4$ in the presence of methane or hydrogen.

Silica solutions exhibit polymerization behavior, resulting in the increase of Si—O—Si bonds and decrease of Si—OH bonds. In an aqueous medium, amorphous silica dissolves (and/or depolymerizes), forming $Si(OH)_4$, which undergoes polymerization to form discrete particles with internal Si—O—Si bonds and external Si—OH bonds on the particle surface. Under certain conditions, the polymeric silica particles thus formed will further associate to give chains and networks comprising the individual particles.

Generally, under neutral or alkaline conditions (pH 7 or greater), the particles tend to grow in size and decrease in number, whereas under acidic conditions (pH<7), the particles have a greater tendency to aggregate to form clusters, and eventually three-dimensional networks. Salts can be present to reduce the electrostatic repulsion between particles, so that aggregation of particles will be more likely to occur Linder neutral or alkaline conditions.

The term "sol" refers to a dispersion of discrete, colloidal particles, for example, of amorphous silica in aqueous media. Under the proper conditions, sols do not gel or settle even after several years of storage, and may contain up to about 50% silica and particle sizes up to 300 nm, although particles larger than about 70 nm settle slowly. A sol can be formed, for example, by growing particles to a certain size in a weakly alkaline solution, or by addition of dilute acid to a solution of sodium silicate (e.g., $Na_2SiO_3$) with rapid mixing, until the pH drops to about 8-10, followed by removal of $Na^+$ (e.g., by ion-exchange resin or electrodialysis). Silica sols, depending upon the type of silica, the particle size, and the nature of the particles, can be destabilized to form gels under mildly acidic to strongly acidic conditions.

The term "gel" refers to a coherent, rigid, continuous three-dimensional network of colloidal particles. Silica gels can be produced by the aggregation of colloidal silica particles (typically under acidic conditions when neutralizing salts are absent) to form a three dimensional gel microstructure. Whether a gel will form under a particular set of conditions, however, can depend on the silica properties, such as, for example, particle size and the nature of the particle surface. The term "hydrogel" refers to a gel in which the pores (spaces within the gel microstructure) are filled with water. Similarly, the term "alcogel" refers to a gel in which the pores are filled with an alcohol. When a gel is dried to form a xerogel, evaporation can result in a substantial collapse of the gel, giving a relatively high density collapsed powder. In contrast, when a gel is dried by means in which the gel microstructure is substantially preserved (e.g., supercritical drying as described in U.S. Pat. No. 3,652,214), a low density xerogel, known as an "aerogel," is formed. Silica aerogels have very unusual and highly desirable properties such as, for example, optical transparency, extremely low density, and unprecedented low thermal conductivity. See Herrmann et al., *Journal of Non-Crystalline Solids*,186, 380-387 (1995).

Synthetic silicas, Such as those described above, typically are hydrophilic, owing to the silanol groups present on the surface of the silica particles. However, to make them more useful in a variety of applications, these silicas can be rendered hydrophobic by a number of different methods. One such method involves chemically treating a form of silica with silanes to replace the silanol groups with methyl groups. Alternatively, the silicas can be rendered hydrophobic by esterification with organic alcohols at high temperatures or by physical adsorption of organic polymers. In the latter case, however, such agents may remain active and can be lost from the silica in the presence of other reactive species, such as water. The corrosion resistant properties, if any, imparted to a composition by such a hydrophobic metal oxide accordingly can be degraded when the composition is exposed to such agents.

A chemically-treated fumed metal oxide can be added to a composition in addition to other rust inhibitors to promote corrosion resistance. In that respect, U.S. Pat. No. 5,098,938 describes a coating composition comprising a film-forming polymer, a corrosion inhibitor (e.g., metal chromates), and a mixture of pyrogenic and crystalline silica, which can be hydrophobic. While it has been shown that compositions similar to the ones described above provide some protection against corrosion when applied to a substrate, it would be desirable to increase the level of corrosion resistance provided by these compositions, so that they can better protect the coated substrate when subjected to adverse conditions.

Thus, a need remains for a surface coating composition that provides improved corrosion resistance when applied to various substrates. The invention seeks to provide such a surface coating composition. These and other advantages of the invention, as well as additional inventive features, will be apparent from the description of the invention provided herein.

BRIEF SUMMARY OF THE INVENTION

The invention provides an anticorrosive surface coating composition comprising a resin system and a hydrophobic metal oxide. The metal oxide itself is characterized by being produced via a wet process and having a surface area of at least about 350 m$^2$/g. The invention also provides a method of producing such an anticorrosive coating composition. The invention further provides a substrate having a surface coated with the surface coating composition of the invention, as well as a method of imparting corrosion resistance to a surface of a substrate.

DETAILED DESCRIPTION OF THE INVENTION

The invention provides an anticorrosive surface coating composition comprising (a) a resin system, and (b) a hydrophobic metal oxide, wherein the metal oxide is produced via a wet process and has a surface area of at least 350 m$^2$/g.

The resin system can comprise any suitable resin. Thus, the resin can be any resin, many of which are known by those of skill in the art, suitable for use in a surface coating composition. Suitable resins include, for example, alkyds, epoxies, urethanes, polyesters, cellulosics, acrylics, and mixtures and precursors thereof. Preferably, the resin comprising at least one epoxy or at least one alkyd. Suitable epoxy resins include the Beckopox® resins from Vianova-Resins/Solutia Inc., and the Epikote® resins from Resolution Performance Products. More preferably, the resin comprising at least one alkyd. Among the useful alkyd resins are those known as Cargill 57-5806 (McWhorter Technologies, Inc.)

Any suitable amount of resin can be present in the surface coating composition. For example, the resin can be present in the surface coating composition in an amount of about 10-95 wt. %. Preferably, the resin is present in the surface coating composition in an amount of about 20-75 wt. %, more preferably in an amount of about 25-50 wt. %.

Any suitable metal oxide can be used in the context of the invention. Suitable metal oxides include silica, alumina, titania, zirconia, ceria, magnesia, and mixtures thereof, with silica being most preferred. The metal oxide used in conjunction with the invention is produced via a wet process. Synthetic amorphous silicas are typically manufactured by either a dry or wet process. The base silica for conventional hydrophobic or other chemically treated silicas, such as Aerosil® R972 manufactured by Degussa, is pyrogenic (i.e., fumed) silica produced via a dry process. In such a process, the silica is produced by the vapor phase hydrolysis of chlorosilanes, such as tetrachlorosilane, in a hydrogen oxygen flame. The silica produced condenses to form droplets, which partially coalesce with one another to form the primary aggregates of fumed silica. In contrast, a typical wet process involves the use of an aqueous sodium silicate solution (i.e., water-glass). At its nomal pH of over 12, the silica remains in solution indefinitely. However, lowering the pH by the addition of an acid (e.g., HCl) causes the dissolved silicate species to grow and aggregate. Depending on the variables of pH, temperature, and salt concentration, the silica precipitates to form individual aggregates of precipitated silica, or the extended structure of a silica gel. The various processes for silica production are well described in Iler, "The Chemistry of Silica" (Wiley-Interscience, 1978).

In accordance with the metal oxide being produced via a wet process, the metal oxide used in conjunction with the invention is typically characterized as being colloidal, precipitated, an aerogel, or a xerogel, with an aerogel being particularly preferred. The term "aerogel" refers to a substantially amorphous organic or inorganic gel with air in the pores. Most preferably, the aerogel comprises silica and is prepared by modifying the surface of a hydrogel with a silylating agent and drying the surface-modified gel. The silica aerogel produced by this process may be partially or completely hydrophobic depending oil the degree and type of silylation. The silica aerogels disclosed in WO 98/23366 are especially desirable as the metal oxide in the surface coating composition of the invention.

The metal oxide can be in the form of discrete individual particles, which can be in aggregated or non-aggregated form. The metal oxide particles can have any suitable diameter. Generally, the metal oxide has a median particle diameter of about 0.2-15 μm. If a matt finish is desired, it is preferred for the metal oxide to have a median particle diameter of about 2-10 μm. Alternatively, the particles can initially be larger (e.g., about 5 mm) and subsequently broken down to the desired size during the manufacture of the surface coating composition.

The metal oxide can have any suitable surface area. Generally, the metal oxide has a surface area of at least about 350 m$^2$/g, preferably at least about 400 m$^2$/g, and most preferably at least about 500 m$^2$/g. In cerrtain embodiments, it is suitable for the metal oxide to have a surface area of at least about 600 m$^2$/g, at least about 700 m$^2$/g, or even at least about 800 m$^2$/g. Generally, the surface area of the metal oxide will not exceed 900 m$^2$/g and will be about 350-900 m$^2$/g. The surface area of the metal oxide can be measured by any suitable method known in the art. Typically, the surface area of the metal oxide is determined by the method of S. Brunauer, P. H. Emmet, and I. Teller. *J Am. Chemical Society*,60, 309 (1938), which is commonly referred to as the BET method.

The metal oxide also can have any suitable tap density, such as about 0.01-0.1 g/cm$^3$. To measure the tap density, a known mass of the dry powder is transferred to a 10 cm$^3$ graduated cylinder and tapped 40 times by hand. The volume is then noted, and the density is calculated as mass/volume.

The metal oxide can have any suitable porosity. Typically the metal oxide has a porosity of about 50% or more, preferably about 70% or more, and most preferably about 80% or more.

By treating the metal oxide with a silylating agent, the metal oxide exhibits a hydrophobic character. Indeed, the silylating agent imparts to the surface of the metal oxide particles a silyl moiety. Any suitable silyl moiety may be bonded to the metal oxide in the context of the invention to obtain the effect. Suitable silyl moieties are derived, for example, from compounds (e.g., silylating agents) of the following general formulae:

$$R_3Si\text{—}O\text{—}SiR_3 \quad (I)$$

$$R_3Si\text{—}N(H)\text{—}SiR_3 \quad (II)$$

wherein the radicals R are identical or different and are each hydrogen or a nonreactive, organic, linear, branched, cyclic, saturated or unsaturated, aromatic or heteroaromatic radical, preferably $C_1$-$C_{18}$ alkyl or $C_6$-$C_{14}$ aryl, more preferably $C_1$-$C_6$ alkyl, cycloalkyl, phenyl, vinyl, or acryl. Equally suitable silyl moieties can be derived from silanes of the formulae $R^1_{4-n}SiCl_n$ or $R^1_{4-n}Si(OR^2)_n$, where n=1-4, and $R^1$ and $R^2$ and are each hydrogen or a nonreactive, organic, linear, branched, cyclic, saturated or unsaturated, aromatic or heteroaromatic radical, preferably a $C_1$-$C_{18}$ alkyl or $C_6$-$C_{14}$ aryl, and more preferably a $C_1$-$C_6$ alkyl, cyclohexyl, or phenyl. The radicals also can contain halogen substituents, such as fluorine or chlorine. Most preferably, the silyl moiety is a trimethyl silyl, a vinyl dimethyl silyl, an acryl dimethyl silyl, or a dimethyl silyl, such that the metal oxide has one or more surface moieties selected from the group consisting of trimethyl silyl, vinyl dimethyl silyl, acryl dimethyl silyl, and dimethyl silyl.

After treatment with a silylating agent, the metal oxide can be characterized by having a degree of hydrophobicity. The term "degree of hydrophobicity" refers to the ratio by volume of methanol in a methanol-water mixture that wets the metal oxide, thereby forming a homogeneous suspension. The metal oxide preferably is characterized by a degree of hydrophobicity of at least about 40%. The degree of hydrophobicity desirably is as high as possible inasmuch as a higher degree of hydrophobicity generally provides improved corrosion resistance.

The contact between the metal oxide particles and the silylating agent can be achieved by any suitable means. For example, a silylating agent can be sprayed onto the metal oxide particles before being mixed with a carrier. It is preferred, however, that the contact between metal oxide particles and a silylating agent comprise adding at least one silylating agent to a metal oxide in a suitable carrier or solvent (e.g., water). For example, a solution of a silylating agent in water can be added to an aqueous mixture of a metal oxide.

The relative ratio of the total amount of silylating agent to the total amount of metal oxide must be high enough so that a sufficient amount of the metal oxide particles contact the silylating agent. Therefore, the metal oxide can be present in the surface coating composition in an amount of about 0.1-30 wt. %, preferably about 0.2-25 wt. %, and most preferably about 0.5-15 wt. %.

Any suitable carrier (e.g., solvent) can be used in the surface coating composition, if desired. A carrier is used to facilitate the application of the resin and metal oxide onto the surface of a suitable substrate. Suitable carriers include inorganic carriers such as water, as well as organic carriers such as hydrocarbons, alcohols, ketones, esters, ethers, aromatics, alkanes, and mixtures thereof. Any suitable concentration of carrier can be present in the surface coating composition, such as up to about 80 wt. %.

The surface coating composition can further comprise any of a variety of other additives that are known in the art to be suitable for incorporation into a surface coating composition, particularly those providing an anticorrosion effect. Suitable additives can include, for example, cationic surfactants, anionic surfactants (e.g., long-chain alkylbenzene sulfonate salts and long-chain, preferably branched chain, alkylsulfosuccinate esters), nonionic surfactants (e.g., polyalkylene oxide ethers of long-chain, preferably branched-chain, alkyl group-containing phenols, polyalkylene oxide ethers of long-chain alkyl alcohols, and fluorinated surfactants), hardeners (e.g., active halogen compounds, vinylsulfone compounds, aziridine compounds, epoxy compounds, acryloyl compounds, isocyanate compounds, etc.), pigment dispersants, thickeners, flowability improvers, antifoamers (e.g., octyl alcohol, silicone-based antifoamers, etc.), foam inhibitors, releasing agents, foaming agents, penetrants, coloring dyes, coloring pigments, whiteners (e.g., fluorescent whiteners), preservatives (e.g., p-hydroxybenzoate ester compounds, benzisothiazolone compounds, isothiazolone compounds, etc.), antifungal agents, yellowing inhibitors (e.g., sodium hydroxynethanesulfonate, sodium p-toluenesulfinate, etc.), ultraviolet absorbers (e.g., benzotriazole compounds having a hydroxy-dialkylphenyl group at the 2-position), antioxidants (e.g., sterically hindered phenol compounds), antistatic agents, pH regulators, water-resisting agents, wet strengthening agents, and dry strengthening agents.

Anticorrosion materials can be present in the surface coating composition to further enhance its anticorrosive properties. Suitable anticorrosion materials for incorporation into the coating composition include chromates, borates, tannins, phosphates (e.g., zinc phosphate), phosphonates, silicates (e.g., calcium silicate), polypyroles, etc.

Additional pigments other than the metal oxide can be present in the surface coating composition. Such pigments include, for example, calcium carbonate, clays, aluminum silicates, urea-formaldehyde fillers, and the like. Other suitable pigments include alumina (e.g., alumina sols, colloidal alumina, cationic aluminum oxide or hydrates thereof, pseudoboehmite, etc.), magnesium silicate, magnesium carbonate, kaolin, talc, calcium sulfate, barium sulfate, titanium dioxide, zinc oxide, zinc sulfide, zinc carbonate, satin white, diatomaceous earth, calcium silicate, aluminum hydroxide, lithopone, zeolite, hydrated halloycite, magnesium hydroxide, polyolefins (e.g., polystyrene, polyethylene, polypropylene, etc.), plastics (e.g., acrylic), urea resin, and melamine resin.

A number of other additives are particularly contemplated for use in a water-based coating composition. For example, a coalescing agent, a flow additive, a defoamer, a surfactant, a rust inhibitor and a pH regulator are all suitable additives which can be incorporated, if desired.

A coalescing agent can be present to promote the softening of the resin during drying of the components of the surface coating composition, and such materials are well known. One example of a coalescing agent is BUTYL CELLOSOLVE (ARCO Chemical Company, Newtown Square, Pa.). Any suitable concentration of coalescing agent can be present in the surface coating composition, such as about 1-35 wt. %.

A flow additive can be present to promote the wetting of the substrate by the surface coating composition and the leveling of the surface coating composition. A typical flow additive is DISBERBYK 301 (BYK-Chemie, Germany). Any suitable concentration of flow additive can be present in the surface coating composition, such as about 0.5-4 wt. %.

A defoamer can be present to reduce the presence of bubbles in the surface coating composition upon mixing of the components. Any suitable defoamer can be used in the surface coating composition of the invention. One preferred defoamer is DISBERBYK 035 (BYK-Chemie, Germany). Any suitable concentration of defoamer can be present in the surface coating composition, such as about 0.01-3 wt. %.

A surfactant can be utilized to reduce the surface tension of the surface coating composition. Any suitable surfactant can be used in the surface coating composition of the invention. One preferred surfactant is SURFYNOL 104 BC (Air Products & Chemicals, Inc.). Any suitable concentration of surfactant can be present in the surface coating composition, such as about 0.01-3 wt. %.

A rust inhibitor can be present in the composition to further enhance the corrosion resistance of the surface coating composition. A variety of rust inhibitors are suitable in the context of the invention. One preferred rust inhibitor is ammonium benzoate. Any suitable concentration of rust inhibitor can be present in the surface coating composition, such as about 0.01-2 wt. %.

A pH regulator can be present in the composition to control the pH of the surface coating composition. The pH of the composition is maintained in a range generally suitable for surface coating compositions, particularly in the context of the substrate intended to be coated with the composition Any suitable pH regulator can be used in the surface coating composition of the invention. For example, the pH can be regulated via the addition of an acid (e.g., mineral acid, acidic cation exchange resin, etc.) or a base (e.g., an alkali metal hydroxide, basic anion exchange resin, etc.). One preferred pH regulator is ammonium hydroxide. Any suitable concentration of pH regulator can be present in the surface coating composition, such as about 1-4 wt. %.

Corrosion resistance can be characterized by visibly examining the extent (if any) of bubbling, cracking, staining, and/or other noticeable damage (e.g., rust) of a surface coated with the surface coating composition of the invention after the surface of the substrate is scratched and exposed to a salt spray. Preferably, the surface coating composition retains its composition resistance for about 6 months or more (e.g., about 1 year or more). The surface coating composition of the invention, in comparison to other coating compositions known in the art, desirably demonstrates less bubbling, the coating is less-widely stained in the region of the scratch, and the damage to the substrate in the vicinity of the scratch is less, after the surface of the coated substrate is scratched and exposed to a salt spray.

The surface coating composition of the invention, after application to a substrate, also may be characterized by providing a matt finish to the substrate. If such a matt finish is desired, the surface coating composition can be characterized by a 60° gloss level of 50 gloss units or less (as measured by a BYK-Gardner gloss meter). More preferably the surface coating composition is characterized by a 60° gloss level of 40 gloss units or less (e.g., 30 gloss units or less). Matt surfaces are desirable for many applications. For example, the reduced glare of surfaces in schools, hospitals, and universities offers less chance of visual distraction, and concentration is better in such environments. Such finishes also demonstrate less tendency to become unsightly as time progresses, as small scratches and imperfections are less obvious than on gloss surfaces.

Anticorrosive surface coating compositions can be applied to a substrate alone or can be used in combination with additional coating compositions. Typically, an anticorrosive surface coating composition is used as a primer (i.e., an undercoat) to enhance the adhesion of subsequent layers of coating compositions to the substrate.

The invention also provides a method of producing an anticorrosive coating composition comprising (a) providing a hydrophobic metal oxide, wherein the metal oxide is produced via a wet process and has a surface area of at least about 350 m$^2$/g, and (b) mixing the metal oxide with a resin to form the surface coating composition. Optionally, the resin and metal oxide can be mixed together with a suitable carrier. The resin, hydrophobic metal oxide, carrier, and composition characteristics are described above with respect to the inventive surface coating composition. Other possible components of the surface coating composition similarly are described above.

The invention also encompasses a substrate having a surface coated with the surface coating composition disclosed herein. Any substrate suitable for the application of a surface coating composition is contemplated by the invention. Preferably the substrate comprises a metal or other inorganic surface (e.g., concrete).

The invention also provides a method of imparting corrosion resistance to a substrate comprising coating a surface of a substrate with the surface coating composition described herein. The substrate can be any suitable substrate (e.g., as described herein).

A substrate can be treated with the surface coating composition by any suitable technique. For example, the surface coating composition can be applied to the substrate by airless and electrostatic spray, brushing, dip, flowcoat, and roller coating. While one coating of the surface coating composition of the invention can be sufficient to impart corrosion resistance to a substrate, more than one coating can be applied. In addition, the flexibility and adhesion of the coating desirably is sufficient to permit later forming of the substrate into parts for various manufacturing operations.

EXAMPLE

This example further illustrates the invention but, of course, should not be construed as in any way limiting its scope. In particular, this example illustrates the excellent corrosion resistance properties of the invented surface coating composition as compared to conventional surface coating compositions.

Two comparative compositions not of the invention (Compositions A and B) and a composition of the invention (Composition C) were prepared using a starting point formulation as set forth in Table 1 and, for Compositions B and C, subsequently adding a hydrophobic silica during the grinding stage of preparation.

TABLE 1

| Component | Amount (wt. %) |
| --- | --- |
| long-oil epoxy ester resin | 40 |
| aliphatic alkanes | 10.25 |
| calcium octoate | 0.2 |
| soya-lecithin | 0.2 |
| zinc oxide | 4 |
| organically modified silicate | 4 |
| titanium dioxide | 14 |
| iron oxide | 0.8 |
| talc | 7 |
| calcium carbonate | 9 |
| mica | 6 |
| methylpropoxy propanol | 3.5 |
| Co naphthenate 6% | 0.15 |
| Ca naphthenate 10% | 0.3 |
| methylethyl ketoxime | 0.6 |

Composition A was formed from the starting point formulation without the addition of a hydrophobic silica thereto. Compositions B and C were formed with the addition of either a hydrophobic silica produced via a dry process (e.g., 0.5 wt. % Aerosil® 972 fumed silica, available from Degussa) or a hydrophobic silica produced via a wet process (e.g., 0.5 wt. % silica aerogel), respectively, to the starting point formulation. The performances of these three surface coating compositions were then evaluated in a corrosion resistance test. Specifically, each of Compositions A-C was applied to a separate metal substrate and allowed to dry. Each coated substrate was then scratched to expose the underlying metal. A standard salt spray test then was performed using a Liebisch SL 1000 salt-spray cabinet and in accordance with DIN 53 167, in which each coated substrate was continuously sprayed with a 5 wt. % NaCl solution while being exposed to a temperature of about 35° C. for a period of approximately 168 hours. After the time period expired, the coated substrates were visually examined for corrosion effects (e.g., bubbling, cracking, and staining). The results of this test are set forth in Table 2.

TABLE 2

| Surface Coating Composition | Surface Area ($m^2/g$) | Median Particle Size (μm) | Tap Density ($g/cm^3$) | Noticeable Damage |
|---|---|---|---|---|
| Composition A | Not applicable (n/a) | Not applicable (n/a) | Not applicable (n/a) | Significant bubbling, cracking and staining |
| Composition B | 110 | 0.02 | 0.05 | Significant bubbling and staining; light cracking |
| Composition C | 690 | 7.6 | 0.04 | Light bubbling, cracking, and staining |

As demonstrated by these results, the surface coating composition of the invention (Composition C) demonstrated an improved protection against corrosion when applied to a metal substrate. The composition containing no hydrophobic silica (Composition A) offered the least protection against corrosion, while the composition containing the hydrophobic fumed silica (Composition B) appeared to reduce the likelihood of cracking. However, it is apparent from the results that, although the composition comprising a hydrophobic silica produced via a dry process (Composition B) demonstrated some degree of protection against corrosion, this composition did not perform as well as the surface coating composition of the invention (Composition C).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An anticorrosive surface coating composition comprising
   (a) a resin system, and
   (b) a hydrophobic metal oxide aerogel comprising silyl moieties on the surface thereof with a surface area of at least about 350 $m^2/g$, wherein the silyl moieties comprise at least one member selected from the group consisting of trimethyl silyl, vinyl dimethyl silyl, acryl dimethyl silyl, and dimethyl silyl,
   wherein the resin system is selected from the group consisting of alkyds, epoxies, urethanes, polyesters, cellulosics, acrylics, and mixtures thereof; wherein the composition further comprises a carrier; and wherein the metal oxide aerogel has a median particle diameter of about 0.2-15 μm.

2. The composition of claim 1, wherein the metal oxide aerogel comprises silica.

3. The composition of claim 1, wherein the composition is further characterized by a 60° gloss level of about 40 gloss units or less after application to a substrate.

4. The composition of claim 3, wherein the composition is characterized by a 60° gloss level of about 30 gloss units or less after application to a substrate.

5. An anticorrosive surface coating composition comprising
   (a) a resin system, and
   (b) a hydrophobic metal oxide aerogel comprising silyl moieties on the surface thereof with a surface area of at least about 350 $m^2/g$, wherein the silyl moieties comprise at least one member selected from the group consisting of trimethyl silyl, vinyl dimethyl silyl, acryl dimethyl silyl, and dimethyl silyl; wherein the resin system comprises at least one alkyd; and wherein the metal oxide aerogel has a median particle diameter of about 0.2-15 μm.

6. The composition of claim 1, wherein the resin system comprises at least one epoxy.

7. The composition of claim 1, wherein the carrier is an organic solvent selected from the group consisting of hydrocarbons, alcohols, ketones, esters, ethers, and mixtures thereof.

8. The composition of claim 1, wherein the metal oxide aerogel is characterized by a degree of hydrophobicity of at least about 40%.

9. The composition of claim 1, wherein the resin is present in an amount of about 10-95 wt. %, and the metal oxide aerogel is present in an amount of about 0.5-15 wt. %.

10. The composition of claim 1, wherein the metal oxide aerogel has a surface area of at least about 500 $m^2/g$.

11. A substrate having a surface coated with a surface coating composition comprising
- (a) a resin system, and
- (b) a hydrophobic metal oxide aerogel comprising silyl moieties on the surface thereof with a surface area of at least about 350 m$^2$/g, wherein the silyl moieties comprise at least one member selected from the group consisting of trimethyl silyl, vinyl dimethyl silyl, acryl dimethyl silyl, and dimethyl silyl, wherein the resin system is selected from the group consisting of alkyds, epoxies, urethanes, polyesters, cellulosics, acrylics, and mixtures thereof; wherein the composition further comprises a carrier; and wherein the metal oxide aerogel has a median particle diameter of about 0.2-15 µm.

12. A method of imparting corrosion resistance to a substrate comprising coating a surface of a substrate with a surface coating composition comprising
- (a) a resin system, and
- (b) a hydrophobic metal oxide aerogel comprising silyl moieties on the surface thereof with a surface area of at least about 350 m$^2$/g, wherein the silyl moieties comprise at least one member selected from the group consisting of trimethyl silyl, vinyl dimethyl silyl, acryl dimethyl silyl, and dimethyl silyl, wherein the resin system is selected from the group consisting of alkyds, epoxies, urethanes, polyesters, cellulosics, acrylics, and mixtures thereof; wherein the composition further comprises a carrier; and wherein the metal oxide aerogel has a median particle diameter of about 0.2-15 µm.

13. A method of producing an anticorrosive surface coating composition comprising
- (a) providing a hydrophobic metal oxide aerogel comprising silyl moieties on the surface thereof with a surface area of at least about 350 m$^2$/g, wherein the silyl moieties comprise at least one member selected from the group consisting of trimethyl silyl, vinyl dimethyl silyl, acryl dimethyl silyl, and dimethyl silyl, and
- (b) mixing the metal oxide aerogel with a resin to form the surface coating composition, wherein the resin system is selected from the group consisting of alkyds, epoxies, urethanes, polyesters, cellulosics, acrylics, and mixtures thereof, wherein the composition further comprises a carrier and wherein the metal oxide aerogel has a median particle diameter of about 0.2-15 µm.

14. The method of claim 13, wherein the metal oxide aerogel comprises silica.

15. The method of claim 13, wherein the composition is further characterized by a 60° gloss level of about 40 gloss units or less after application to a substrate.

16. The method of claim 15, wherein the composition is further characterized by a 60° gloss level of about 30 gloss units or less after application to a substrate.

17. A method of producing an anticorrosive surface coating composition comprising
- (a) providing a hydrophobic metal oxide aerogel comprising silyl moieties on the surface thereof with a surface area of at least about 350 m$^2$/g, wherein the silyl moieties comprise at least one member selected from the group consisting of trimethyl silyl, vinyl dimethyl silyl, acryl dimethyl silyl, and dimethyl silyl, and
- (b) mixing the metal oxide aerogel with a resin to form the surface coating composition, wherein the resin system comprises at least one alkyd and wherein the metal oxide aerogel has a median particle diameter of about 0.2-15 µm.

18. The method of claim 13, wherein the resin system comprises at least one epoxy.

19. The method of claim 13, wherein the carrier is an organic solvent selected from the group consisting of hydrocarbons, alcohols, ketones, esters, ethers, and mixtures thereof.

20. The method of claim 13, wherein the metal oxide aerogel is characterized by a degree of hydrophobicity of at least about 40%.

21. The method of claim 13, wherein the resin is present in an amount of about 10-95 wt. %, and the metal oxide aerogel is present in an amount of about 0.5-15 wt. %.

22. The method of claim 13, wherein the metal oxide aerogel has a surface area of at least about 500 m$^2$/g.

* * * * *